Dec. 4, 1962 W. V. TURNER 3,066,758
LUBRICATION SYSTEM
Filed Dec. 22, 1958 4 Sheets-Sheet 1

INVENTOR
WILLIAM V. TURNER
BY John C. Black
ATTORNEY

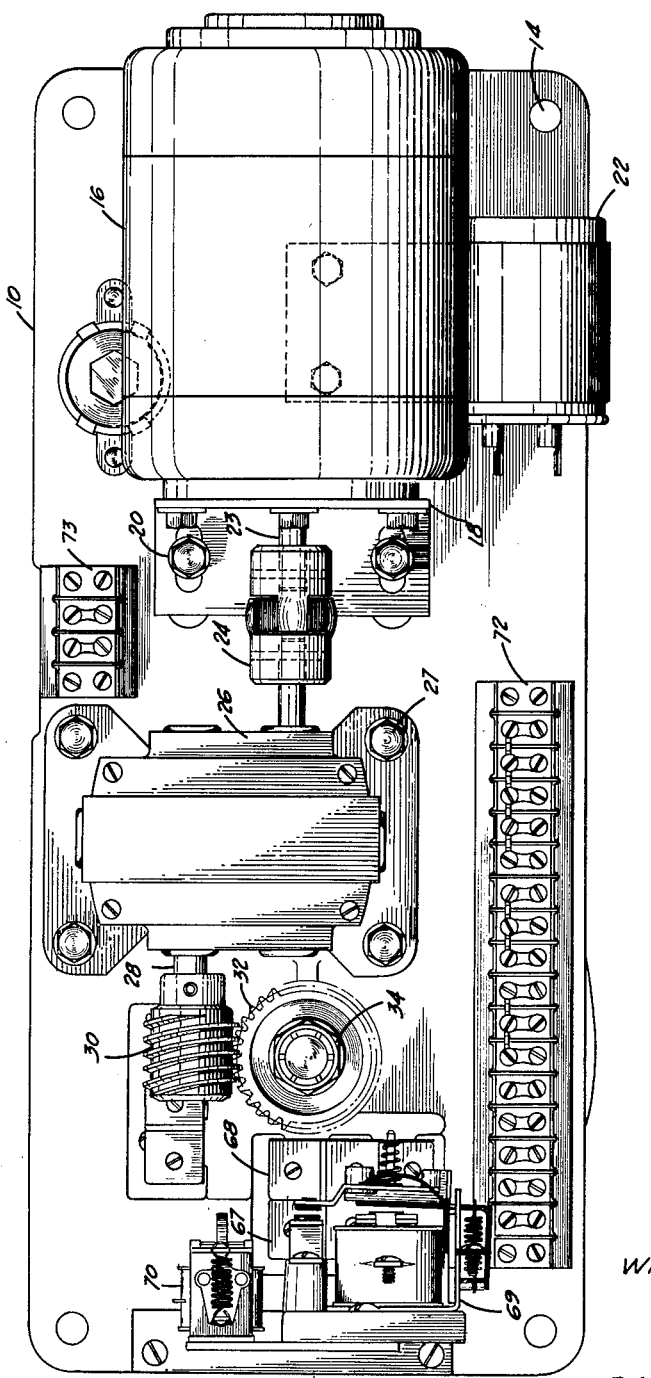

Dec. 4, 1962 W. V. TURNER 3,066,758
LUBRICATION SYSTEM
Filed Dec. 22, 1958 4 Sheets-Sheet 3
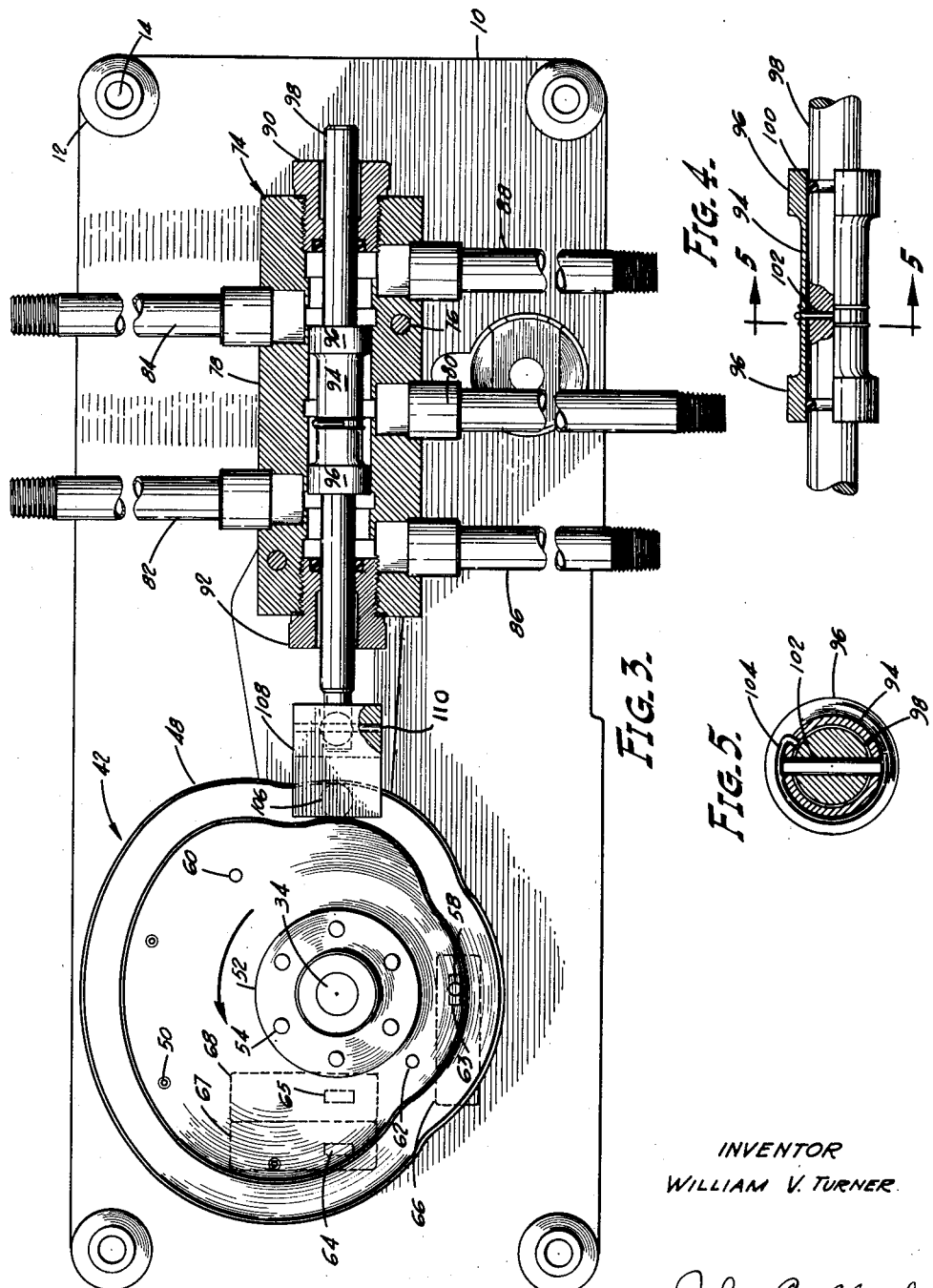
INVENTOR
WILLIAM V. TURNER
BY John C. Black
ATTORNEY

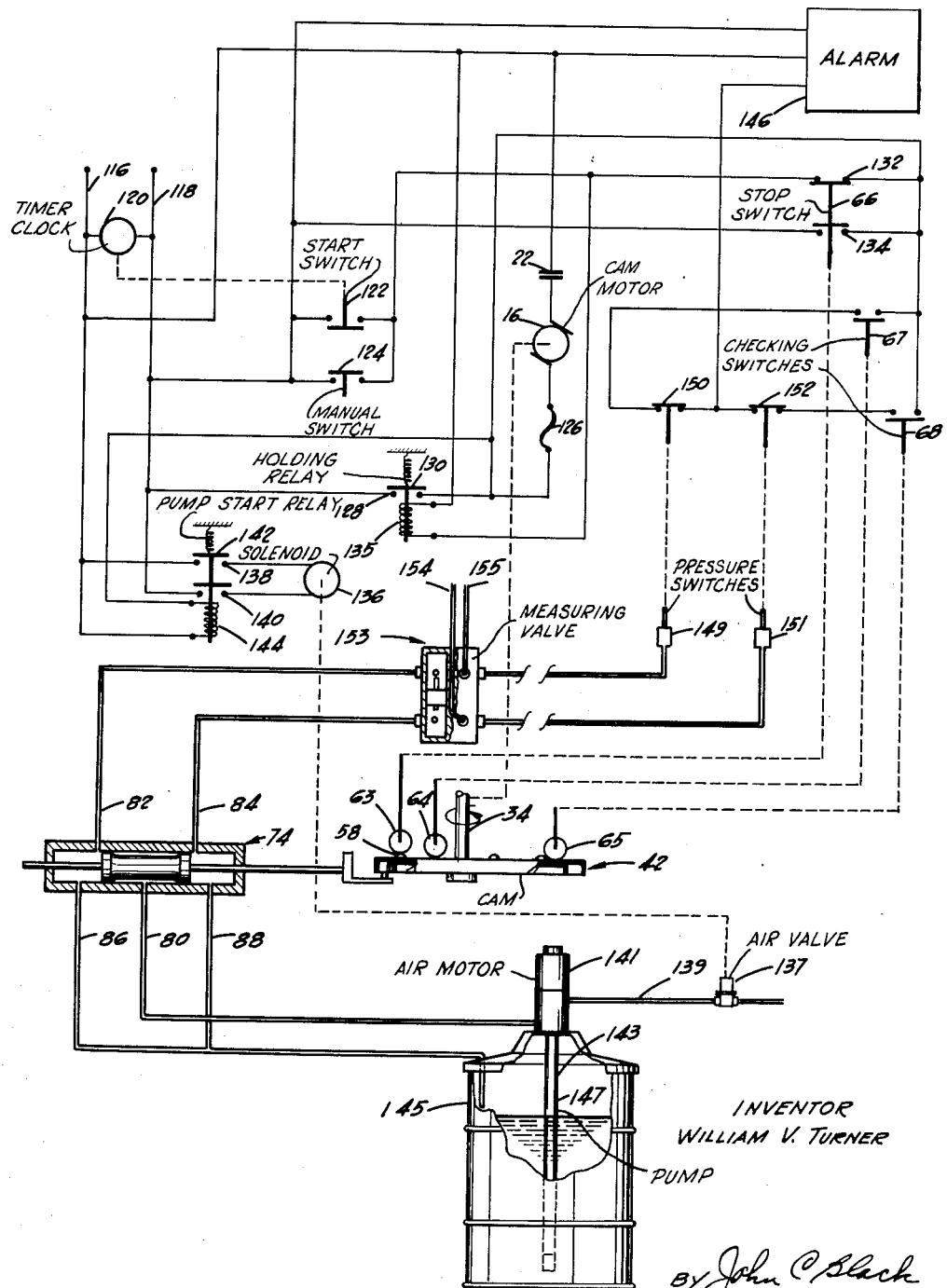

United States Patent Office 3,066,758
Patented Dec. 4, 1962

3,066,758
LUBRICATION SYSTEM
William V. Turner, Chicago, Ill., assignor to Stewart-Warner Corporation, Chicago, Ill., a corporation of Virginia
Filed Dec. 22, 1958, Ser. No. 782,066
5 Claims. (Cl. 184—7)

This invention relates to improvements in centralized lubrication systems of the type which are operated through a predetermined cycle in response to an initiating signal. More particularly this invention relates to improvements in the means for controlling the lubrication cycle.

Centralized lubrication systems having a controlled cycle are shown in prior art patents to Wedeberg, 2,545,-719 and 2,563,765, and Walker, 2,581,314. The improved cycle-controlling apparatus disclosed herein has been particularly adapted for use in systems generally of the type disclosed in the patents; however, the invention is not to be limited specifically thereto. The improved cycle controlling apparatus of the present invention performs the same or similar functions of the corresponding apparatus in the patents; however, its construction is basically different from those shown in the patents as will be pointed out hereinafter.

In a typical lubrication system of this type a reversing valve controls the connection of a pressurized lubricant to a first line for supply measured quantities of lubricant to bearing surfaces of a machine to be lubricated, the subsequent venting of said line, the connection of the pressurized lubricant to a second line for supplying measured quantities of lubricant to the same or other bearing surfaces of the machine, and the subsequent venting of the second line. This lubrication cycle must be performed according to a desired timed cycle which is independent of the widely varying lubricant pressures and independent of the widely varying viscosities of the lubricants utilized. In many applications, very high lubricant pressures and highly viscous greases are utilized. As a result, the power required to actuate the reversing valve is substantial.

Because of the substantial power requirements of the reversing valve for many applications, the prior art devices utilized separate devices for controlling the timing cycle of the valve and for supplying the actuating power for the valve. Thus, the typical prior art device included clock-operated timing cams for determining the cycle timing and electromagnetic solenoids controlled by the cams for actuating the reversing valve.

The applicant herein has discovered that it is feasible to provide a structure which both actuates the reversing valve and accurately and reliably controls the timing of such actuation. As a result, the applicant has been able to achieve a construction which is relatively simplified, drastically reduced in cost, and more reliable.

Accordingly, it is a primary object of this invention to provide in a centralized lubrication system an improved cycle controlling arrangement. This object has been made possible by utilizing a hysteresis synchronous motor which maintains a constant speed irrespective of the varying torque loads applied thereto, a timing cam rotated by the motor and connected to the reversing valve for operating the valve through a predetermined cycle together with means on the cam for controlling the stopping of the motor after a predetermined cycle incident to the starting of the motor by a control signal.

The lubricating cycle is usually started again after any predetermined time as determined by a timing device. However, it is often highly desirable to start the lubricating cycle at any time independent of the cycle timing device. It is, therefore, another object of this invention to provide both manual and time-controlled means for starting the lubricating cycle.

In the prior art devices such as those disclosed by said patents, the combining of the timing cams and the clock mechanisms necessitates critical adjustments of the cams and clock relative to each other as well as certain inflexibility of operation. For example, provision for manual operation of the prior art systems at times between the normal timed cycles is not practical since the clock itself controls the cycle. Accordingly, it is another object of the present invention to provide a more versatile and flexible timing and cycling control apparatus in which a lubrication cycle may be initiated in response to a single starting pulse from any source such as a clock, a manually operable push button, or a machine start relay, or which cycle can be repeated continuously.

The lubricating systems commonly used for the purpose of supplying a lubricant from a single source to various points of a machine are usually maintained by repairmen with little electrical experience. Hence, it is a further object of this invention to provide a cycle lubricating device for a centralized lubricating system wherein there is no complex electrical interaction between the various components and wherein the system is relatively free of troubles, is easy to troubleshoot and repair, and requires no timing or alignment adjustments.

It is also an object of this invention to provide a motor actuated centralized lubricating system timing device and control valve in which all the major components are mounted on a single table and this table may be removed from its support for repair by simply disconnecting the hydraulic and electrical lines leading thereto.

It is another object of this invention to provide an improved cam construction for actuating a control valve as well as an improved valve construction including shear means in the valve which will fail in the event of excessive forces.

Other objects and advantages of this invention will be apparent from the following detailed description and claims when taken in connection with the accompanying drawings, which disclose, by way of example, the principles of this invention and the best mode which has been contemplated of applying these principles.

In the drawings:

FIG. 2 is a top plan view of the device shown in FIG. 1;

FIG. 3 is a bottom plan view of the device shown in FIG. 1 with portions of the control valve assembly shown in section;

FIG. 4 is a detailed partial sectional elevation view of the control valve;

FIG. 5 is a sectional view taken along line 5—5 of FIG. 4;

FIG. 6 is a schematic view illustrating the electric and hydraulic circuits of this invention and the interaction thereof.

Figure 1:
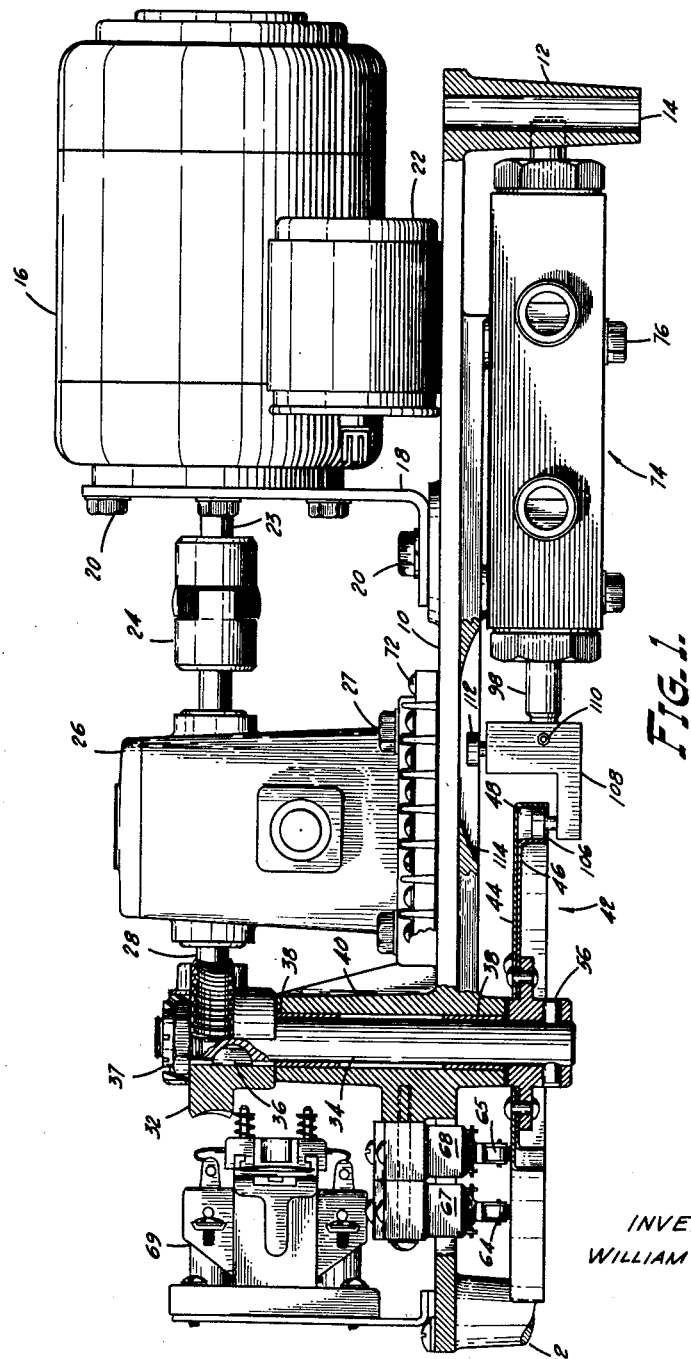
FIG. 1 is a side elevation view, partially in section, showing the motor operated centralized lubricating system timer and control device of this invention.

Briefly, this invention includes a control valve for controlling the supply of pressurized lubricant to a machine. A special cam is provided for positively actuating the control valve and this cam is driven by a hysteresis synchronous motor through suitable gear trains. The lubricant cycle is controlled by the control valve, valve drive cam, and the electric motor. Thus, energizing the motor by an electrical means will start the cycle, e.g., by either manual or time-controlled electric switches. The cycle is ended by stopping the motor by means of a switch actuated by additional cam surfaces on the valve drive cam. The valve drive cam also has means thereon for actuating checking switches to check and give an alarm if the pressure within the lubricant lines leading to the machine is insufficient.

Referring to the drawings, in FIG. 1 there is shown a support table 10 adapted to support all of the principal mechanical elements of the invention. The table 10 includes legs 12 at each corner thereof having holes 14 centrally therein for mounting the table on a suitable enclosure. A cam 42 includes sheet metal laminations 44 and 46 providing an inverted U-shaped cam track 48. The cam laminations are secured together by suitable rivets 50, FIG. 3, and the cam is attached to a supporting collar 52 by additional rivets 54. The collar 52 is in turn secured to rotate with shaft 34 by a pin 56.

As shown in FIG. 3, the laminations 44 and 46 which are held together by rivets 50 are also secured by three additional rivets 58, 60 and 62 which are spaced different radial distances from the axis of rotation of shaft 34. These rivets have specially designed protruding heads on the upper surface of the cam and these heads are adapted to be engaged by roller-type switch actuators 63, 64 and 65 of suitable microswitches 66, 67 and 68. Also mounted on table 10 in addition to the microswitches 66 are relays 69 and 70 and suitable terminal strips 72 and 73. The specific function and circuitry of these switches, relays and the other electrical components will be described in detail hereinafter.

A suitable control valve 74 is provided for controlling the supply of lubricant from a pressurized source to suitable measuring valves and hence to the machine. This control valve is secured to the supporting table 10 by suitable screw means 76. As shown in FIG. 3, the valve 74 includes a cylindrical body 78 having a lubricant inlet conduit 80 secured thereto for supplying lubricant under pressure to the cavity therein. Also secured in the valve body 78 are a pair of lubricant outlet conduits 82 and 84 as well as a vent for each of the outlet conduits. These vents are shown in FIG. 3 as conduits 86 and 88. The valve body 78 is closed in each end by suitable sealing bushings 90 and 92. The valve passage controlling member is a spool 94 having lands 96 at opposite ends thereof. This spool is in the form of a sleeve and fits over a central actuating rod 98, FIG. 4. Suitable O-ring gaskets 100 seal the rod 98 and the spool sleeve 94.

Valve sleeve 94 is connected to the actuating rod 98 by a shear pin 102. This shear pin extends through the center of the rod 98 and the spool sleeve 94 as shown in FIG. 5. The shear pin is retained in place by a C-shaped retainer clip 104. If excessive forces oppose the movement of the spool sleeve 74, shear pin 102 will fail and an alarm, to be described hereinafter, will be given before the next lubricating cycle is completed.

The valve is actuated by means of its direct connection to the cam track 48 of the cam 42. A cam follower roller 106 on a cam follower block 108 is guided for movement within the track 48 of the cam. The cam follower block 108 is secured to the actuating rod 98 by a pivoted pin 110 which extends through the block and the end of the rod 98 as shown in FIG. 3. The cam follower block 108 is guided for reciprocating movement only by means of a guide roller 112 cooperating with a slot 114 in the bottom of the supporting table 10. The cam track 48 thus provides positive actuation and return of the control valve.

A schematic illustration of the electrical and lubricating circuits of this invention is shown in FIG. 6. The electrical circuit includes a conventional source of electrical energy such as 115 volts A.C. which is supplied through conductors 116 and 118 to the circuit.

A suitable timer clock 120 is connected across these conductors for operating the lubrication system at predetermined time intervals. When so connected, the clock 120 is operated continuously and actuates a start switch 122 at such time intervals as are desired. The switch 122 is connected in parallel with a push button manual switch 124. Each switch, when actuated to close its contacts, will initiate a cycle of operation of the lubricating system.

A holding relay 130 includes a coil 135 which is energized upon the actuation of switch 122 or switch 124 by way of conductor 116, coil 135, the contacts of the actuated switch 122 or 124, and conductor 118. A cam drive motor 16 is energized at the same time over circuit including conductor 116, a starting capacitor 22 of the motor, a suitable fuse 126, contacts 132 of a stop switch 66, contacts of the actuated switch 122 or 124 and conductor 118. A pump start relay 142 is also energized over a similar circuit.

The switches 122 and 124 when operated close their associated contacts only momentarily. Therefore, means must be provided for maintaining the holding ray 130, the motor 16, and the relay 142 operated after the switch contacts open. Accordingly, a holding circuit for the relay 135 is provided, this circuit including conductor 116, coil 135 of the holding relay, contacts 132 of a stop switch 66, contacts 128 of the holding relay, and conductor 118. Relay 135 completes a holding circuit including contacts 128 and conductors 116 and 118 for the motor 16 and relay 142.

The contacts 132 of the stop switch 66 are actuated to the closed position at the end of a cycle of the lubrication system and are maintained closed until a short time interval after the beginning of the next succeeding lubrication cycle. The stop switch 66 includes a second pair of contacts 134, which contacts are closed when the contacts 132 are opened and maintained in the closed position during the lubrication cycle until the contacts 132 are again closed at the end of the cycle. The switch 66 is actuated by the rivet head 58 on the control cam 42 when the rivet head is directly below the switch at the end of a lubrication cycle and for a short time interval at the beginning of the next succeeding cycle.

The pump start relay 142 and the motor 16 are maintained energized over holding circuits including the contacts 134 of the stop switch 66 when said contacts are closed as described above. At this time, contacts 132 are open as a result of which the holding relay 135 restores.

The motor 16, when energized as described above, rotates the cam 42 through one revolution and is then de-energized when the rivet head 58 actuates the switch 66 to open contacts 134. The motor 16 is preferably a hysteresis synchronous motor which maintains a constant speed and therefore performs a timing function. The pump start relay 142, when actuated as described above, completes a circuit including its contacts 138 and 140 for energizing the solenoid 136 of a solenoid operated air valve 137.

The air valve 137 controls a supply of air under pressure through line 139 to an air motor 141. A lubricant pump 143 is driven by the air motor 141 and this pump withdraws lubricant from a lubricant container 145 through the pumping cylinder 147 and pumps this lubricant to the control valve 74 through conduit 80.

A suitable alarm 146 is connected in the electrical circuit such that it may be selectively actuated when the pump 143 and the control valve 74 fail to pressurize one or both of the lubricant lines 82 and 84. A pair of normally closed contact sets 150 and 152 are connected in parallel in one of the electrical circuit lines leading to the alarm 146. These contacts are opened by pressure responsive switches 149 and 151 at the ends of the lines 82 and 84 when each respective line is subjected to a predetermined minimum lubricant pressure. Checking switches 67 and 68 have their contacts connected in series with the pressure-operated contacts 150 and 152. Switches 67 and 68 are actuated by rivets 60 and 62 respectively on cam 42 as the cam rotates. If each of the lubricant lines 82 and 84 is pressurized when its respective rivet head 60 or 62 operates switch 67 and 68, the respective circuit will be open at 150 or 152; and there will be no alarm. If pressure is not developed at the end of either line, the respective contacts 150 or 152 will remain closed; and, when the respective checking switch 67 or 68 is actuated, a circuit is completed for actuating the alarm 146.

A measuring and reversing valve 153 is connected to the lines 82 and 84 in a well known manner to supply a measured amount of lubricant to a line 154 when the line 82 is pressurized and a measured amount of lubricant to a line 155 when the line 84 is pressurized. The lines 154 and 155 are connected to machine bearings requiring lubrication. A plurality of valves (not shown) such as 153 are provided in a typical installation.

The operation of the device and system will now be described. Prior to the start of a lubricating cycle the elements of the system will be in the position shown in FIG. 6, the time clock 120 will be running, but the time switch 122 and manual switch 124 will be open with the holding relay coil 135 de-energized; thus holding relay contacts 128 will be open and the cam drive motor 16 will not be running. The contacts 132 of the stop switch 66 will be closed and the contacts 134 of the stop switch will be open. The pump relay coil 144 will not be energized and the pump relay contacts 138 and 140 will not be made by the relay 142; thus the solenoid 136 will be de-energized. Both of the checking switches 67 and 68 will be open and both of the end of the line switch contact sets 150 and 152 will be closed as there will be no pressure in the lubricating lines 82 and 84.

To start the lubricating cycle either the time switch 122 or the manual switch 124 may be actuated. Since these switches are connected in parallel, actuation of either one of them will energize the holding relay coil 135, the cam drive motor 16, and the pump relay 142. The motor 16 initiates the rotation of cam 42 to start the lubrication cycle. The coil 144 closes contacts 138 to operate the solenoid 136 which opens the air valve 137. The air motor 141 operates the lubricant pump 143 to supply lubricant under pressure to the reversing valve 74.

The manual switch 124 or the time switch 122 opens after a short time interval, and the holding relay coil 135 will be locked in through the holding relay contacts 128 and the contacts 132 of the stop switch 66. With the cam drive motor 16 operating, the cam 42 will slowly start to rotate; and the actuator 63 for the stop switch 66 will come off the rivet head 58 allowing contacts 134 to close and opening contacts 132. This de-energizes the holding relay coil 135 and causes biased holding relay contacts 128 to open. At this time, control of the cam drive motor 16 and the pump relay coil 144 is governed by the contacts 134 of the stop switch 66.

As the cam 42 continues to rotate, the cam track 48 causes the cam follower 106 to reciprocate the valve rod 98 and open the valve admitting lubricant under pressure from line 80 through the valve to line 82. The next event in the sequence of operations is the actuation of the checking switch 67 which will close its contacts to check for lubricant pressure in the line 82. If there is sufficient pressure in line 82, the end of the line switch 149 will have opened its contacts 150 to prevent operation of the alarm 146 when switch 67 closes its contacts. Continued rotation of cam 44 actuates the valve 74 to shut off the supply of lubricant to line 82, to vent the line 82, and to supply the lubricant to line 84. Then the rivet head 62 actuates the checking switch 68 to check for pressure in lubricant line 84. As the cam continues to rotate for a complete revolution, the rivet head 58 will actuate the stop switch 66 to open switch contacts 134 thus stopping the cam drive motor 16 and de-energizing the pump relay coil 44 to stop the pump 143. The cycle may then be started again by the actuation of the manual switch 124 or the time control switch 122 under control of clock 120. Of course, if it is desired to continuously repeat the cycle without interruption, the control may be wired to bypass the stop switch 66 and continuously energize cam drive motor 16 and the pump relay 142.

While there have been shown and described and pointed out fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A centralized lubricating system comprising: a reservoir containing lubricant, pump means for withdrawing lubricant from said reservoir and placing said lubricant under pressure, a measuring and reversing valve connected to machine elements to be lubricated in a predetermined cycle, at least two lubricant inlet conduits connected to said measuring and reversing valve, a control valve connected to said conduits, said control valve adapted to supply lubricant from said pressurized lubricant line to either one of said conduits leading to said measuring and reversing valve, a cam, means connecting said cam to said control valve to positively operate the same, a rotary electric motor, means connecting said motor to rotate said cam, a holding relay operated in response to a cycle initiating signal for energizing the motor, circuit means including contacts controlled by the cam for maintaining the holding relay operated for a short time interval after its initial operation, circuit means including contacts controlled by the cam for maintaining the motor energized after the holding relay restores until the end of the cycle.

2. A lubricating system as defined in claim 1 further comprising a motor for the pump means, and electrically operated apparatus controlled by the holding relay and by cam operated contacts for energizing the motor at the start of a cycle and for maintaining the motor energized until the end of the cycle.

3. A lubricating system as defined in claim 2 further comprising an alarm, a checking circuit for actuating said alarm when the pressure in said lubricant conduits at said measuring and reversing valve fails to reach predetermined minimum value, said checking circuit for each lubricant conduit comprising a pressure-responsive switch actuated by pressure in said conduit, and a checking switch in series with said pressure-responsive switch, said checking switch being actuated by said cam.

4. A system for lubricating a machine in a predetermined timed cycle, said system comprising: a lubricant inlet conduit containing a pressurized source of lubricant, a control valve connected to the conduit, two outlet lubricant conduits connecting the control valve with a plurality of reversing and measuring valves adapted to supply lubricant under pressure to a machine, the control valve adapted to connect the lubricant inlet conduit with either of the outlet conduits alternately, a cam connected to the control valve for positively actuating the same, a constant speed electric motor operatively connected to the cam for driving the same at a desired speed independent of the cam and control valve load to accomplish the predetermined lubricating cycle, electric circuit means connected to the motor for actuation thereof, electric circuit control means actuated by said cam for controlling the operation of said motor and therefore controlling said cycle, pressure-actuated switch contacts actuated by pressure in an outlet conduit having a value higher than a predetermined minimum, checking switch contacts actuated by the cam in series with the pressure-actuated contacts, there being a pressure-operated switch and a checking switch for each outlet conduit, an alarm, and an electrical circuit including the contacts of the switches energizing the alarm in the event that the pressure in either of the lubricant outlet conduits fails to reach the predetermined minimum value.

5. Lubricating apparatus adapted to supply at widely varying pressures lubricants of widely varying viscosities to machines in a predetermined cycle, said apparatus comprising: means including a control valve for connecting a source of lubricant at a resired pressure to a machine to be lubricated, cam means connected to said control valve for positively operating the control valve through a predetermined cycle, a constant speed motor driving said cam means, means controlled by said cam means for stopping said motor at the end of said predetermined cycle; said cam means comprising laminated sheet metal providing an enclosed track for positive operation of said valve, and rivets securing the laminations and positioned for operating engagement with the means for stopping the motor.

References Cited in the file of this patent
UNITED STATES PATENTS

| | | |
|---|---|---|
| 1,090,651 | Riley | Mar. 17, 1914 |
| 1,783,589 | Shepard | Dec. 2, 1930 |
| 1,950,158 | Barks | Mar. 6, 1934 |
| 2,048,003 | Hawks | July 21, 1936 |
| 2,254,795 | Daniels | Sept. 2, 1941 |
| 2,316,408 | Dawson | Apr. 13, 1943 |
| 2,339,532 | Venable | Jan. 18, 1944 |
| 2,585,189 | Tear | Feb. 12, 1952 |
| 2,635,691 | Filliung | Apr. 21, 1953 |
| 2,677,791 | Rudd et al. | May 4, 1954 |
| 2,845,142 | Schneller | July 29, 1958 |